(12) United States Patent
Bradwell et al.

(10) Patent No.: US 8,323,816 B2
(45) Date of Patent: Dec. 4, 2012

(54) ALKALINE EARTH METAL ION BATTERY

(75) Inventors: David Bradwell, Somerville, MA (US); Donald R. Sadoway, Watertown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 578 days.

(21) Appl. No.: 12/505,937

(22) Filed: Jul. 20, 2009

(65) Prior Publication Data

US 2011/0014503 A1    Jan. 20, 2011

(51) Int. Cl.
*H01M 10/44* (2006.01)
*H01M 4/36* (2006.01)
*H01M 4/48* (2010.01)
*H01M 6/20* (2006.01)
*H01M 4/13* (2010.01)
*H01M 4/58* (2010.01)

(52) U.S. Cl. ........ 429/103; 429/50; 429/105; 429/231.6
(58) Field of Classification Search ............ 429/50, 429/101, 102, 103, 105, 122, 125, 188, 206, 429/207, 209, 218.1, 231.6
See application file for complete search history.

(56) References Cited

U.S. PATENT DOCUMENTS

| | | | |
|---|---|---|---|
| 3,238,437 A * | 3/1966 | Foster et al. | 320/150 |
| 3,245,836 A * | 4/1966 | Bernard | 429/419 |
| 3,419,432 A | 12/1968 | Hesson | |
| 3,488,221 A | 1/1970 | Shimotake et al. | |
| 3,775,181 A * | 11/1973 | Ryerson | 429/103 |
| 3,933,521 A | 1/1976 | Vissers et al. | |
| 4,011,374 A | 3/1977 | Kaun | |
| 4,216,273 A | 8/1980 | Cadart et al. | |
| 4,999,097 A | 3/1991 | Sadoway | |
| 5,185,068 A | 2/1993 | Sadoway | |
| 2008/0044725 A1 * | 2/2008 | Sadoway et al. | 429/149 |
| 2011/0014505 A1 | 1/2011 | Bradwell et al. | 429/51 |

FOREIGN PATENT DOCUMENTS

| | | |
|---|---|---|
| EP | 0078404 A2 | 5/1983 |
| EP | 0078404 A2 | 5/1983 |
| WO | WO-2008/105811 A2 | 9/2008 |

OTHER PUBLICATIONS

"Notification of Transmittal of the International Search Report and the Written Opinion of the International Searching Authority, or the Declaration," International Filing Date: Aug. 15, 2007, International Application No. PCT/US2007/018168, Applicant: Massachusetts Institute of Technology, Date of Mailing: Sep. 18, 2008, pp. 1-13.

(Continued)

*Primary Examiner* — Philip Tucker
*Assistant Examiner* — Brian R Slawski
(74) *Attorney, Agent, or Firm* — Sunstein, Kann, Murphy & Timbers LLP

(57) ABSTRACT

Electrochemical cells having molten electrodes comprising an alkaline earth metal provide receipt and delivery of power by transporting atoms of the alkaline earth metal between electrode environments of disparate alkaline earth metal chemical potentials.

34 Claims, 7 Drawing Sheets

OTHER PUBLICATIONS

"Notification of Transmittal of the International Search Report and the Written Opinion of the International Searching Authority, or the Declaration," International Filing Date: Jul. 20, 2010, International Application No. PCT/US2010/002035, Applicant: Massachusetts Institute of Technology, Date of Mailing: Feb. 7, 2011, pp. 1-17.

Cairns, E.J. et al., "High Temperature Batteries—Research in high-temperature electrochemistry reveals compact, powerful energy-storage cells," *Science*, vol. 164, No. 3886, Jun. 20, 1969, pp. 1347-1355.

Shimotake, H. et al., "Bimetallic Galvanic Cells With Fused-Salt Electrolytes," Argonne National Laboratory, Argonne, Illinois, pp. 951-962.

Shimotake, H. et al., "Secondary Cells with Lithium Anodes and Immobilized Fused-Salt Electrolytes," *I & EC Process Design and Development*, vol. 8, No. 1, Jan. 1969, pp. 51-56.

Jarrett, N., et al. "Advances in the Smelting of Aluminum," *Metallurgical Treatises*, pp. 137-157, 1981.

Pongsaksawad, W., et al. "Phase-Field Modeling of Transport-Limited Electrolysis in Solid and Liquid States," *Journal of the Electrochemical Society*, 154 (6) pp. F122-F133, 2007.

Atthey, D.R. "A Mathematical Model for Fluid Flow in a Weld Pool at High Currents," *J. Fluid Mech.* vol. 98, Part 4, pp. 787-801, 1980.

Cairns, E.J., et al. "Galvanic Cells with Fused-Salt Electrolytes," *AEC Research and Development*, 44 pages, Nov. 1967.

Advisory Action Before Filing of Appeal Brief, U.S. Appl. No. 12/839,130, filed Jul. 19, 2010, 8 pages, dated Jun. 8, 2012.

Advisory Action Before Filing of Appeal Brief, U.S. Appl. No. 12/839,130, filed Jul. 19, 2010, 6 pages, dated May 10, 2012.

Final Office Action, U.S. Appl. No. 12/839,130, filed Jul. 19, 2010, 11 pages, dated Mar. 16, 2012.

Response After Final Rejection; U.S. Appl. No. 12/839,130, filed Jul. 19, 2010, 12 pages, filed Apr. 27, 2012.

Supplemental Amendment After Final Rejection, U.S. Appl. No. 12/839,130, filed Jul. 19, 2010, 9 pages, filed May 15, 2012.

\* cited by examiner

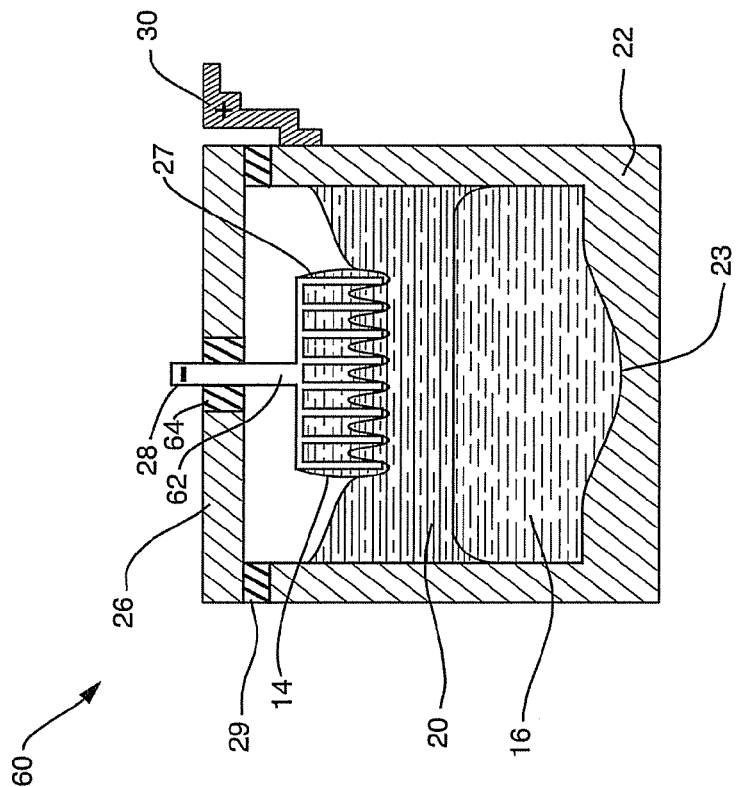
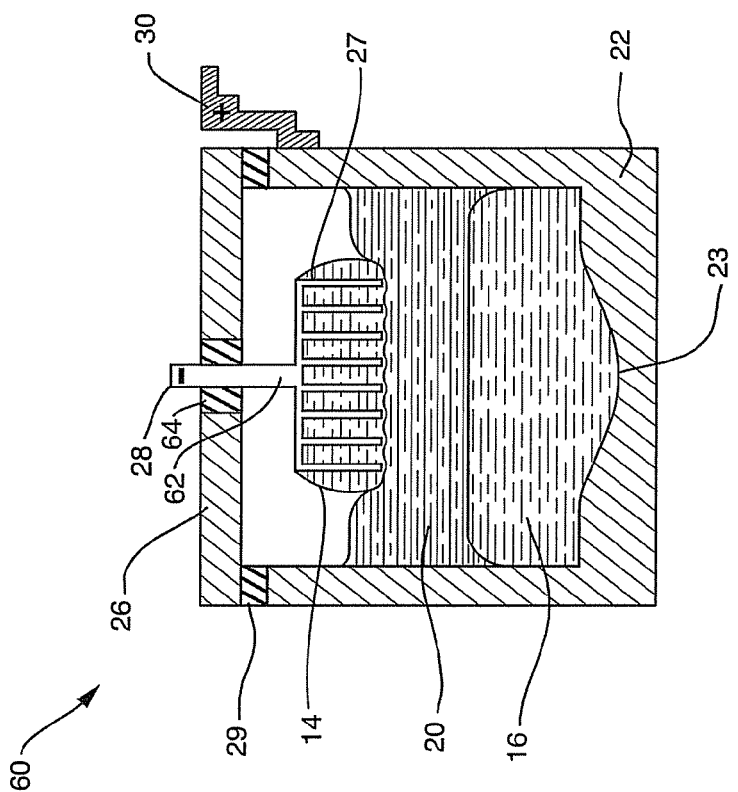

ALKALINE EARTH METAL ION BATTERY

BACKGROUND OF THE INVENTION

1. Field of the Invention

The invention relates to electrical energy storage. In particular, energy storage by reversible electrochemical oxidation and reduction of a molten metal is disclosed.

2. Background Information

Balancing supply and demand of electrical energy over time and location is a longstanding problem in an array of applications from commercial generator to consumer. The supply-demand mismatch causes systemic strain that reduces the dependability of the supply, inconveniencing consumers and causing loss of revenue. Since most electrical energy generation in the United States relies on the combustion of fossil fuels, suboptimal management of electrical energy also contributes to excessive emissions of pollutants and greenhouse gases. Renewable energy sources like wind and solar power may also be out of sync with demand since they are active only intermittently. This mismatch limits the scale of their deployment. Large-scale energy storage may be used to support commercial electrical energy management by mitigating supply-demand mismatch for both conventional and renewable power sources.

One approach to energy storage is based on electrochemistry. Conventional lead-acid batteries, the cheapest commercial battery technology on the market, have long been used for large-scale electrochemical energy storage. Facilities housing vast arrays of lead-acid cells have been used to provide high-capacity electricity storage, on the order of 10 MW. However these facilities are neither compact nor flexibly located. The short cycle life of lead-acid batteries, on the order of several hundred charge-discharge cycles, limits their performance in uses involving frequent activation over a wide voltage range, such as daily power management. The batteries do not respond well to fast or deep charging or discharging, which lowers their efficiency and reduces their lifespan.

Sodium-sulfur ("NAS") batteries have been adapted to large-scale power management facilities in the US and Japan. An NAS battery incorporates molten sodium and sulfur electrodes opposed across a solid ceramic electrolyte. The electrolyte must be very thin in order to maximize sodium ion conduction, but this makes it mechanically fragile and imposes severe limits on the maximum size of an individual cell. This, in turn, affects scalability, i.e., large capacity must be achieved through many small cells rather than through few large cells, which greatly increases complexity and ultimately increases the cost of the system. Cell construction is complication by sodium's violent reaction with water and rapid oxidation in air.

There is, accordingly, a need for an energy storage device combining capacity, economy, flexibility and long life.

SUMMARY OF THE INVENTION

An alkaline earth metal ion battery receives or delivers energy by transporting an alkaline earth metal, referred to herein as the active alkaline earth metal, between two molten electronically conductive electrodes via an electrochemical pathway. An electrolyte comprising a cation of the active alkaline earth metal enables=ionic transport of the active alkaline earth metal during charging or discharging.

Neutral active alkaline earth metal resides at a relatively high chemical potential in an active metal electrode of the battery and at a lower chemical potential in an alloy electrode of the battery. The voltage deliverable by the battery originates in the difference between the higher and lower activities of the active alkaline earth metal in the respective molten electrodes. Atoms of the active alkaline earth metal in the active metal electrode represent stored power deliverable by transfer of the metal to the lower-chemical-potential environment in the alloy electrode.

The all-liquid system supports rapid ionic migration and facile, reversible reaction kinetics at both electrodes.

BRIEF DESCRIPTION OF THE DRAWINGS

The invention description below refers to the accompanying drawings, wherein identical reference numerals designate analogous functional elements, and in which:

FIGS. 5A-5B are vertical sections illustrating an alkaline earth metal-ion energy storage cell constructed in accordance with the invention, having a liquid metal negative electrode held in a solid permeable structure;

FIGS. 7A-7C are perspective views, in which FIG. 7A shows a single alkaline earth metal-ion energy storage cell constructed in accordance with the invention, FIG. 7B shows a linear assembly of four cells and FIG. 7C shows a 16-cell array.

The figures are not, in general, drawn to scale.

DETAILED DESCRIPTION OF AN ILLUSTRATIVE EMBODIMENT

Figure 1:
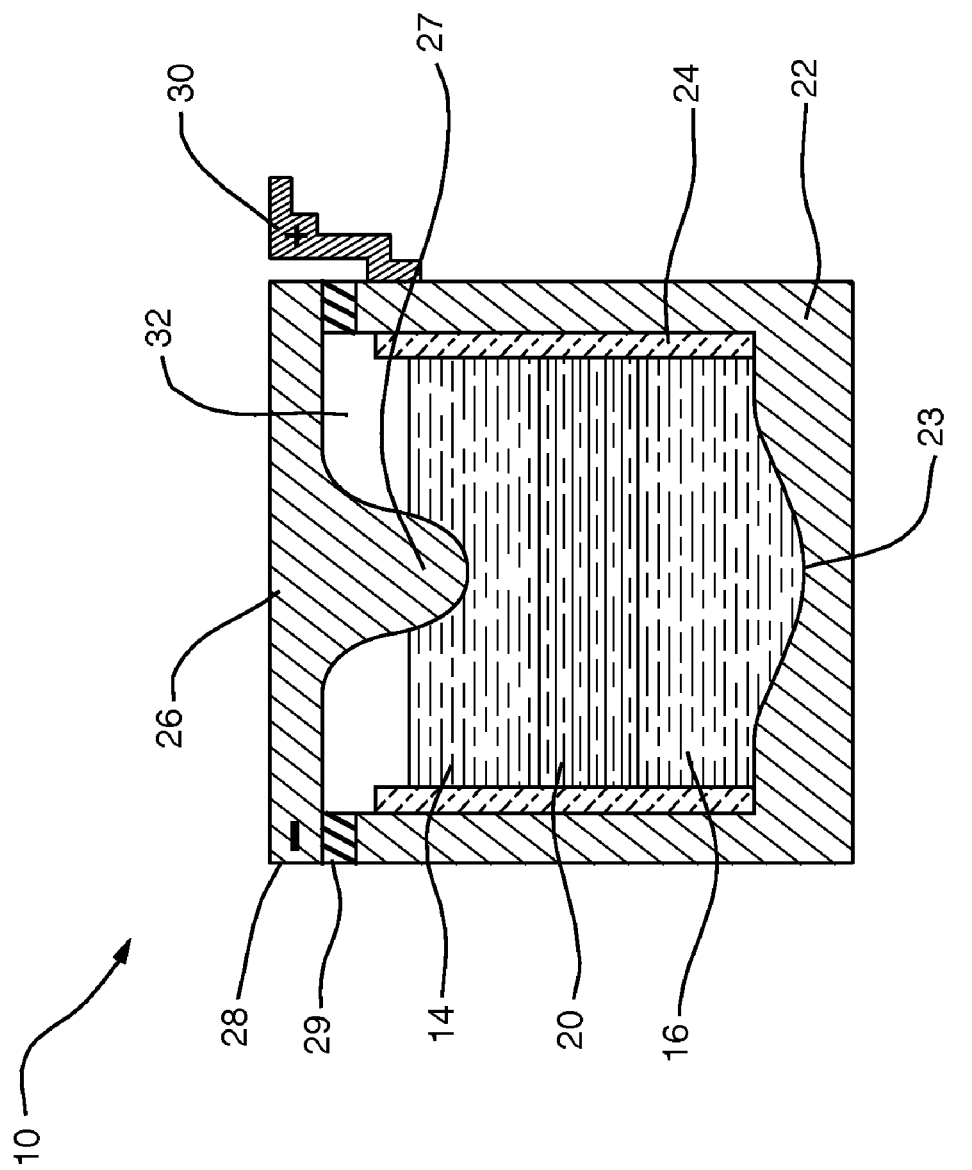
FIG. 1 is a vertical section showing a self-segregating alkaline earth metal-ion energy storage cell constructed in accordance with the invention.

With reference to FIG. 1, an alkaline earth metal ion energy storage cell 10 houses three distinct liquid constituents: a molten metal body 14 that serves as negative electrode, also referred to as the active metal electrode; an electronically conductive liquid alloy body 16 that serves as positive electrode, also referred to as the alloy electrode; and an intervening ionically conductive electrolyte 20.

The liquid constituents are housed in an electronically conductive container 22 which provides mechanical support to an insulating inner sheath 24. The sheath 24 prevents shorting by electronic conduction between the negative electrode 14 and the positive electrode 16 through the container 22.

The cell is covered by an electronically conductive lid 26. An insulative seal 29 electrically insulates the lid 26 from the container 22 and confines molten constituents and vapors to the container 22. A portion of the lid 26 in contact with the negative electrode 14 functions as a negative current collector 27, through which electrons pass between the molten active metal electrode 14 and an external source or sink (not shown) by way of a negative terminal 28. A portion of the container 22 in contact with the positive electrode 16 functions as the positive current collector 23, through which electrons pass between the alloy electrode 16 and the external source or sink by way of a positive terminal 30. The placement of the negative terminal 28 and the positive terminal 30 may facilitate arranging individual cells in series by connecting the negative terminal 28 of one cell to the positive terminal of another cell 10.

An inert gas layer 32 overlaying the negative electrode 14 may accommodate global volume changes in the three-phase system during charging and discharging or due to changes in temperature. Optionally, the lid 26 or seal 29 incorporates a safety pressure valve (not shown).

The container 22 and lid 26 are each of a material having the requisite electronic conductivity, mechanical strength, and resistance to chemical attack by the liquid electrodes 14 and 16 and electrolyte 20. The sheath 24 is of an electronically insulating material and may be corrosion-resistant against the two liquid electrodes 14 and 16 and the molten electrolyte 20. Boron nitride, aluminum nitride, alumina, and magnesia are candidate sheath materials. The seal 29 may be formed of one or more materials such as magnesia cement, aluminoborate glasses, and other high temperature sealants as known to those skilled in the art.

The electrodes 14 and 16 and electrolyte 20 are constituted to establish chemical and physical properties compatible with simplicity and economy of construction, robustness, and rapid and efficient receipt and delivery of electrical energy. The use of electronically conductive liquids for electrodes 14 and 16 with a liquid electrolyte 20 facilitates facile oxidation and reduction of the active alkaline metal and its cation at the electrodes 14 and 16. The electronic conductivity of the liquid electrodes promotes high current density during operation of the cell 10 by enabling electron-transfer reactions to occur at sites over entire liquid electrode-electrolyte interfaces rather than being limited to triple-phase intersections. Furthermore, because reactions at both electrodes occur entirely in the liquid state, the reaction kinetics are not throttled by the nucleation of distinct product phases. Thus, the cell constituents are consistent with extremely high current densities on the order of 1 $A/cm^2$, a magnitude observed in the high-temperature electrometallurgical industry, e.g., in the electrolytic production of aluminum.

The chemical compositions of the molten electrodes 14 and 16 are formulated conjunctionally to incorporate an active alkaline earth metal, such as magnesium or calcium, at respective disparate chemical potentials, thereby generating voltage between the electrodes 14 and 16. In order to create chemical potential disparity of the active alkaline earth metal between the negative 14 and positive 16 electrodes, at least one of the electrodes 14 and 16 includes one or more alloying elements miscible with the active alkaline earth metal in a liquid phase. The one or more alloying elements are chosen to constitute the positive electrode 16 as an environment of relatively low chemical potential of the active alkaline earth metal, compared to the negative electrode 14, when the cell 10 is in a charged state.

In choosing alloying elements for the electrodes 14 and 16, not only solution thermodynamics of the electrodes 14 and 16 but also their interactions with the electrolyte 20 must be considered, as well as their relative densities and liquid ranges. Any element in the electrodes 14 or 16 in addition to the active alkaline earth metal ideally should not interact with the ions in the electrolyte in a way that would provide a competing pathway for charge transport and circumvent the prescribed electrode reactions. Thus, elements that may be appropriate for alloying with the active alkaline earth metal in the alloy electrode 16 to reduce the active metal activity may include aluminum, tin, lead, germanium, indium, pnicogens such as bismuth and antimony, and chalcogens such as tellurium and selenium. The electrodes 14 and 16 may include other species, for example, to tailor physical properties or enable electrochemical monitoring of the extent of discharge, as is known to those skilled in the art. For example, one or more additional transition metals or metalloids, such as copper, silicon, iron, or gallium, may be added in smaller quantities to adjust the density and/or melting point.

The use of calcium or magnesium in the electrodes 14 and 16 of the all-liquid alkaline earth metal ion energy storage cells 10 has several advantages over conventional battery materials. The voltage generated by a calcium-metalloid couple exceeds the corresponding voltage of an analogous lithium- or sodium-based system, correlating with a larger energy capacity on a molar basis. Calcium and magnesium are relatively inexpensive compared to lead or alkali metals. The alkaline earth metals in the electrodes 14 and 16 of the alkaline earth metal ion energy storage cells 10 are furthermore easier to manage than alkali metals in that they may be safely handled in open air, do not react violently with water, and can be held with bare hands. Additionally, whereas an alkali metal cation carries a single positive charge, an alkaline earth metal cation carries a +2 charge and consequently makes available in theory a doubled charge capacity of the alkaline earth metal ion energy storage cell 10 compared to alkali metal cells.

The electrolyte 20 of the cell 10 may be a molten salt, dissolving a cation of the active alkaline earth metal, also referred to herein as an active cation, and one or more supporting compounds. Illustratively the molten salt is a chloride, such as a chloride of the active alkaline earth metal. A supporting compound is typically added to enhance ionic conductivity, and/or to inhibit electronic conductivity through the electrolyte. Other additives to the electrolyte 20 may reduce the viscosity, depress the melting point, alter the density, or reduce vapor pressure. The supporting electrolyte and any other additives illustratively have free energies of formation more negative than that of the reaction compound so that the cationic constituents of the supporting electrolyte and any additive electrodeposit at more extreme values of potential, or at higher values of cell voltage, than that associated with moving the active alkaline earth metal from the active metal electrode 14 to the alloy electrode 16, in order to limit the electrode reactions to the oxidation and reduction of the active alkaline earth metal. These and other considerations informing the choice of electrolyte composition are known to those skilled in the art.

If the active alkaline earth metal is calcium, the electrolyte 20 may further include complexing ligands to reduce the solubility of elemental calcium in molten calcium chloride. Ligands delivered by large monovalent cations having a relatively low charge density may complex divalent cations such $Ca^{2+}$. For example, chloride anions introduced by addition of potassium chloride, sodium chloride, or other appropriate alkali metal-halide salts may lower the solubility of calcium metal in a calcium-halide mixture. Electrolyte compositions in the system $KCl$—$KI$—$KBr$—$CaCl_2$, at 5 mol % to 50 mol % $CaCl_2$, may provide the desired combination of ionic conductivity, melting temperature and complexing action.

The compositions of the electrode 14 and 16 and electrolyte 20 may be formulated so that all-liquid operation occurs at moderately elevated temperatures, illustratively between 400° C. and 750° C. Operation at high temperatures, e.g., greater than about 400° C., facilitates electrode reaction kinetics and ion migration in the electrolyte 20. However, difficulties such as volatilization of cell constituents, structural weakness, chemical attack of ancillary materials, and power required to maintain liquidity of the electrodes 14 and 16 and electrolyte 20 become more likely as operating temperature increases. Operation below 750° C. may afford the kinetic advantages of high temperatures without the associated drawbacks.

The electrodes 14 and 16 and the electrolyte 20 may be furthermore formulated so that their densities are ordered in accordance with their functions in the cell. A cell having respective densities increasing or decreasing in the order negative electrode 14/electrolyte 20/positive electrode 16 may spontaneously self-segregate into the illustrated layered structure upon melting, providing for simple manufacture from billets.

Alkaline earth metal ion energy storage, for example by the cell 10, is not limited to any particular method of attaining or remaining at its operating temperature. The constituents may be melted in a separate heated chamber with sufficient superheat to allow transfer to the container 22. In another approach, external heaters (not shown) placed, for example, within the wall of the container 22 may be used before or during operation. Alternatively, the cell 10 may be self-heating during operation through applied overpotentials. Techniques for achieving and managing temperature profiles in molten constituents, and other practical aspects of electrometallurgical systems potentially helpful to implementing power storage using liquid alkaline earth metal electrodes, such as construction of apparatus for use with molten salts and liquid metals, are known to those skilled in the art. For example, the construction and operation of the Hall-Héroult cell for aluminum extraction has been described in U.S. Pat. Nos. 4,999,097 and 5,185,068, the entire disclosures of which are incorporated herein by reference.

Figure 2:
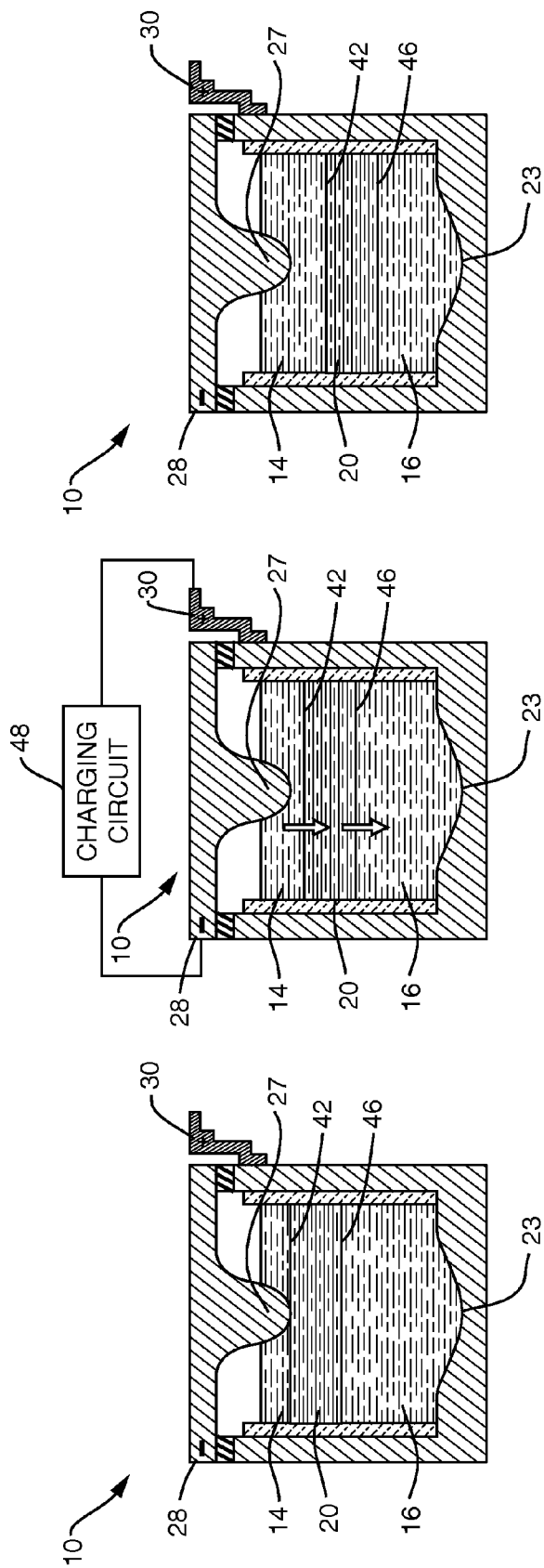
FIGS. 2A-2C are vertical sections illustrating the charging process of a self-segregating alkaline earth metal-ion energy storage cell constructed in accordance with the invention.

FIGS. 2A-2C illustrate the function of the cell 10 during charging. FIG. 2A shows the cell 10 in an uncharged or discharged state. Before charging, the positive electrode 16 contains atoms of the active alkaline earth metal. The negative electrode 14 meets the electrolyte 20 at an active metal-electrolyte interface 42. The positive electrode 16 meets the electrolyte 20 at an alloy-electrolyte interface 46.

With reference to FIG. 2B, to initiate charging, the terminals 28 and 30 are connected to an external charging circuit 48 driving transport of the active alkaline earth metal from the positive electrode 16, through the electrolyte 20 to neutral metal at a higher chemical potential in the negative electrode 14. During charging, electron current travels from the external circuit through the negative current collector 27 into the negative electrode 14 and to the active metal-electrolyte interface 42. Active cations $M^{2+}$ move across the electrolyte 20 toward the active metal-electrolyte interface 42. The active cations and the electrons meet at the interface 42 and are consumed in the reduction half-cell reaction $M^{2+}+2\ e^-\rightarrow M$. The neutral active alkaline earth metal atoms M created in the half-cell reaction accrue to the negative electrode 14. As the active alkaline earth metal M accumulates in the negative electrode 14, the active metal-electrolyte interface 42 moves further away from the negative current collector 27. At the alloy-electrolyte interface 46 atoms of the active alkaline earth metal M in the positive electrode are oxidized in the half-cell reaction $M\rightarrow M^{2+}+2\ e^-$. As active cations $M^{2+}$ enter the electrolyte 20, electrons are freed to pass through the positive current collector 23 to the external charging circuit 48. Oxidation of the active alkaline earth metal atoms M shrinks the positive electrode 16, and the alloy-electrolyte interface 46 moves toward the positive current collector 23.

FIG. 2C shows the cell 10 in its final charged state. Charging has changed the composition of at least the positive electrode 16 by loss of atoms of the active alkaline earth metal. The alloy electrode 16 may in principle be nominally free of the active alkaline earth metal, and therefore not actually be an alloy at this point in the charge-discharge cycle. The thickness of the negative electrode 14 has grown at the expense of the positive electrode 16. Since the charging process is conservative with respect to the active cations, the thickness of the electrolyte 20 is ideally unchanged.

The active alkaline earth metal deposited in the molten active metal electrode 14 represents stored electrical energy which may persist indefinitely, as long as no external electronic path joins the two electrodes 14 and 16. The half-cell reactions in the cell 10 generate liquid-phase products that remain at the electrodes 14 and 16, in contact with the electrolyte. While the electrodes 14 and 16 and electrolyte 20 are at a liquid range temperature, the active alkaline earth metal and the active cation remain available to mechanize discharge via an electrochemical pathway. This reversibility suits the active alkaline earth metal ion cells for energy storage.

Figure 3:
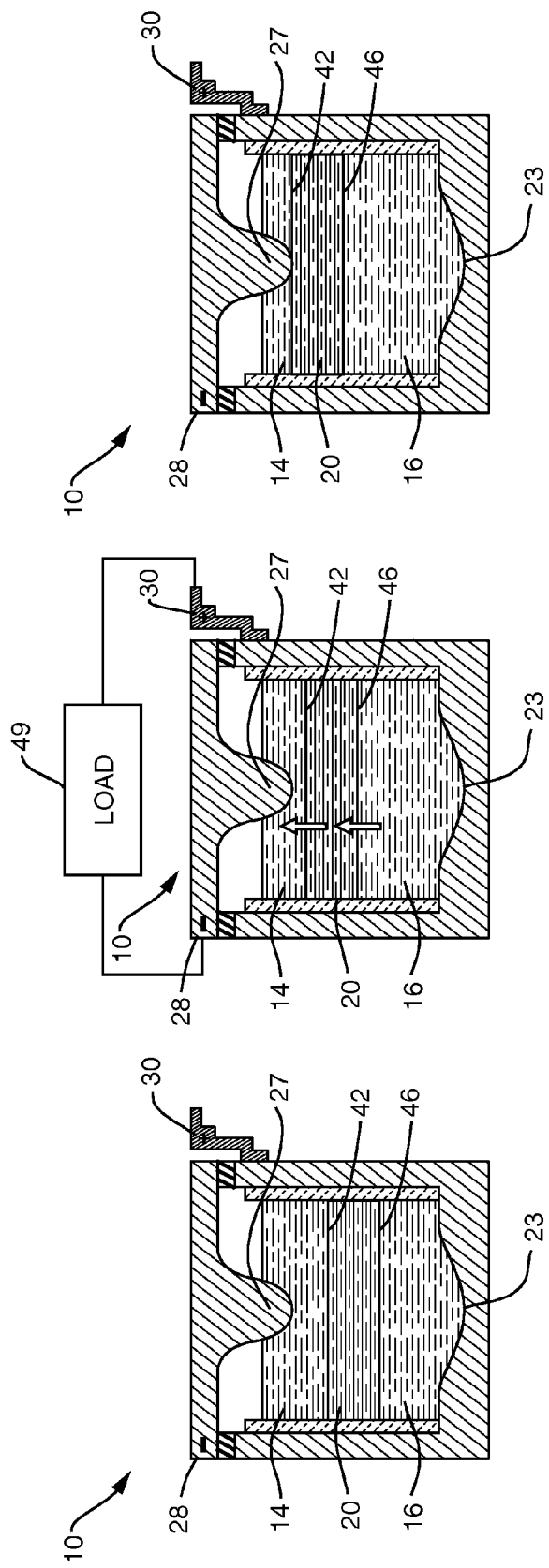
FIGS. 3A-3C are vertical sections illustrating the discharging process of a self-segregating alkaline earth metal-ion energy storage cell constructed in accordance with the invention.

FIGS. 3A-3C illustrate discharging the cell 10. FIG. 3A shows the cell 10 in a charged state. With reference to FIG. 3B, connecting the terminals 28 and 30 to an external load 49 initiates discharge. During discharge the active alkaline earth metal moves spontaneously from the negative electrode 14, through the electrolyte 20 as active cations, and reverts to neutral metal at a lower chemical potential in the positive electrode 16. Electron current travels into the cell through the positive current collector 23 and the positive electrode 16 to the alloy-electrolyte interface 46. Active cations $M^{2+}$ migrate across the electrolyte 20 toward the alloy-electrolyte interface 46. Active cations $M^{2+}$ and electrons are consumed at the interface 46 in the reduction half-cell reaction $M^{2+}+2\ e^-\rightarrow M$. The neutral active alkaline earth metal atoms M produced accrue to the positive electrode 16. As the active alkaline earth metal M accumulates in the negative electrode 16, the alloy-electrolyte interface 46 moves further away from the positive current collector 23. At the active metal-electrolyte interface 42, atoms of the active alkaline earth metal M in the negative electrode 16 are oxidized in the half-cell reaction $M\rightarrow M^{2+}+2\ e^-$. The active cations $M^{2+}$ produced enter the electrolyte 20, and the freed electrons pass through the negative current collector 27 to the external load 49. Oxidation of the active alkaline earth metal atoms causes attrition of the negative electrode 14, with movement of the active metal-electrolyte interface 42 toward the negative current collector 27.

FIG. 3C shows the cell 10 in its final discharged state. Charging has changed the composition of at least the positive electrode 16 due to accretion of active alkaline earth metal atoms. The thickness of the positive electrode 16 has grown at the expense of the negative electrode 14. Since the discharging process is conservative with respect to the active cations, ideally the thickness of the electrolyte 20 is unchanged. The substantially constant thickness of the electrolyte layer throughout the charge-discharge cycle enables the use of an electrolyte layer that is relatively thin compared to the electrode bodies. The thin electrolyte layer, combined with the inherently low resistivity of molten halides, minimizes the ohmic overpotential associated with the electrolyte. The energy capacity of the cell 10, which is no greater than the smaller of the quantities of active alkaline earth metal that can be accommodated by the negative electrode 14 and by the positive electrode 16, respectively, can be augmented by increasing the quanitity of material in the electrodes 14 and 16 without, in principle, increasing the mass of the electrolyte 20 or its associated IR drop. For example, the thickness of the electrolyte 20 may be on the order of only 10%, 20% or 50% of the thickness of either of the electrodes 14 and 16.

In an illustrative embodiment, referred to herein as the calcium-bismuth cell, the active alkaline earth metal of the cell 10 is calcium ($\rho_{liquid} \approx 1.4$ g/ml), and the alloying element diluting calcium activity in the alloy electrode is bismuth ($\rho=9.8$ g/ml, $T_m=271°$ C.). The electrolyte 20 is based on the KCl—CaCl$_2$ eutectic ($T_m=600°$ C.) at 25 mol % CaCl$_2$ with 10 mol % KI added to increase density. The liquid densities of KCl, CaCl$_2$, and KI are 1.5 g/ml, 2.07 g/ml, and 2.33 g/ml, respectively. The operating temperature of the cell 10 is about 700° C. The container 22 and lid 26 are, illustratively, of mild steel.

In addition to calcium, the active metal electrode 14 comprises magnesium, so the liquid range of the electrode 14 is in the moderately elevated temperature range, lower than the melting point of calcium (850° C.). Diluting the calcium in the active metal electrode 14 necessarily reduces the activity of calcium in the electrode 14, thereby reducing the cell voltage. A relatively marked reduction in voltage is to be expected when the resulting system, like the calcium-magnesium binary system, forms compounds in the solid state, indicative of a negative deviation from ideality. An enabling discovery of cells having calcium as the active alkaline earth metal, such as the calcium-bismuth cell, is that it is possible to add another metal to the electrode 14 in sufficient quantity to bring the operating temperature into the desired moderately elevated range without unacceptable compromise of the cell voltage. For example, adding magnesium to 80 atomic percent may give the active metal alloy 14 a melting temperature less than 700° C. while only diminishing the voltage of the calcium ion cell by about 0.1 V. The calcium concentration in the active metal electrode 14 of a cell having Ca$^{2+}$ as the active ion may be less on an atomic basis than about 80%, 50%, 30%, 20% or 10%, with the balance magnesium, lithium or sodium. The calcium concentration in the active metal electrode 14 may be greater on an atomic basis than about 20%, 40%, or 60%.

When the cell is fully charged (FIG. 3A), the molten active metal electrode 14 of the cell 10 is a body of about 20 atomic percent calcium in magnesium ($\rho_{liquid}=1.5$ g/ml, $T_m \approx 650°$ C.), and the alloy electrode 16 is a body of molten bismuth. After discharge (FIG. 3C), the active metal electrode 14 is relatively depleted of calcium. The calcium missing from the active metal electrode 14 has been transferred to the positive electrode 16, which has become a bismuth-calcium alloy. The open-circuit voltage of the calcium-bismuth cell fully charged is on the order of 1 V.

Figure 4:
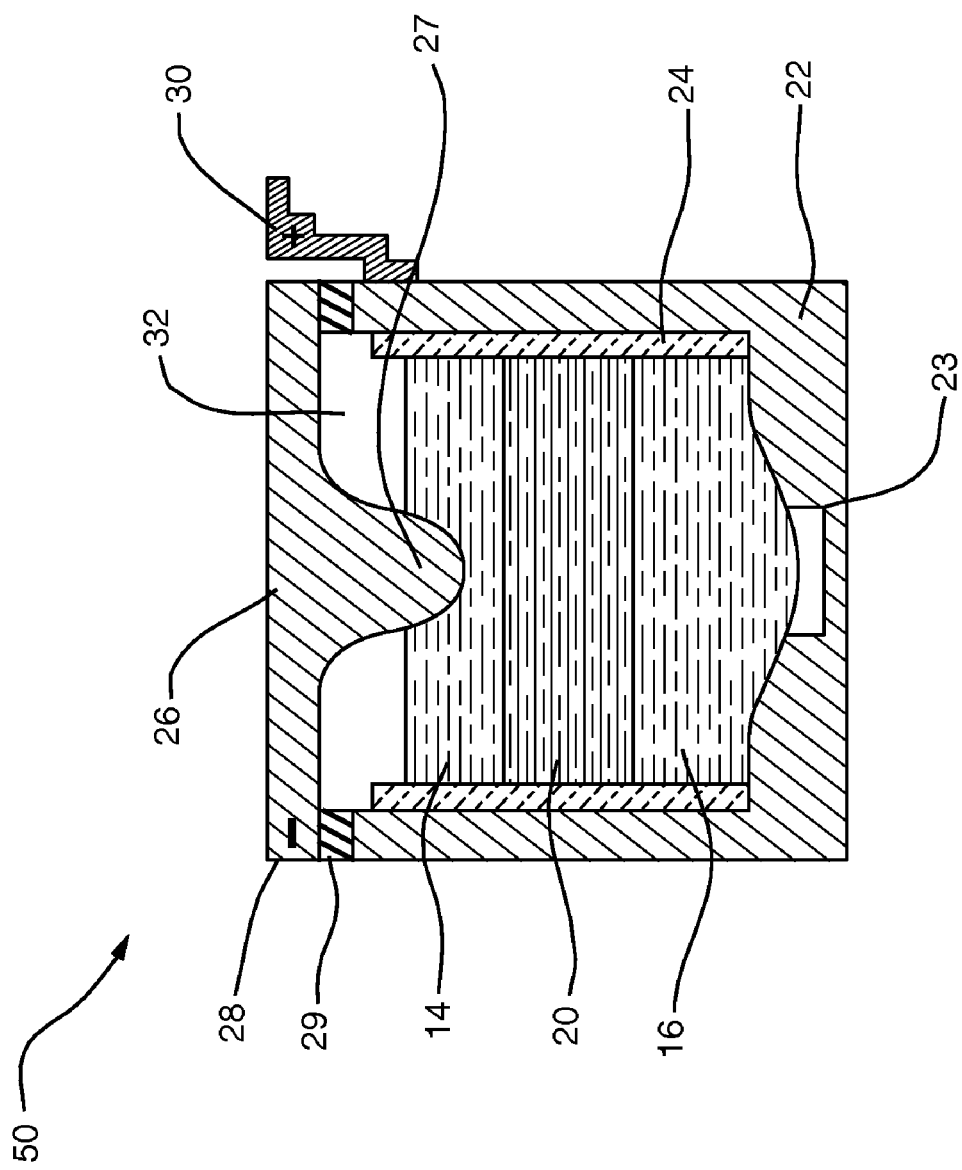
FIG. 4 is a vertical section showing another embodiment of the self-segregating alkaline earth metal-ion energy storage cell constructed in accordance with the invention.

In another illustrative embodiment, referred to herein as a magnesium-antimony cell, the active alkaline earth metal of a cell 50, shown in FIG. 4, is magnesium ($\rho=1.5$ g/ml, $T_m=650°$ C.), and the alloying element diluting magnesium activity in the alloy electrode 16 is antimony ($\rho=6.5$ g/ml, $T_m=630°$ C.). The electrolyte 20 residing between the electrodes 14 and 16 comprises magnesium chloride. The magnesium-antimony cell illustratively operates around 700° C. The container 22 and lid 26 are fashioned, illustratively, out of graphite. The insulating sheath 29 is made of boron nitride. A metal plug, illustratively of tungsten, compression fit in the bottom of the container 22 functions as the positive current collector 23. A molten salt such as magnesium chloride in the electrolyte 20 more readily wets the graphite bottom of the container 22 than does a molten metal such as the alloy electrode 16, thereby blocking electronic conduction between the positive electrode 16 and the container 22. The metal plug secures an electronically conductive pathway between the molten positive electrode 16 and the positive terminal 30.

When the cell 50 is fully charged (FIG. 3A) each of the electrodes 14 and 16 is its respective nominally pure liquid element. After discharge (FIG. 3C), the active metal electrode 14 remains monoelemental, but smaller in mass than when the cell 50 is charged. The magnesium missing from the active metal electrode 14 has been transferred to the positive electrode 16, which has become an antimony-magnesium alloy. The alloying potential of magnesium in antimony at 700° C. is on the order of 0.5 V.

The actual open-circuit voltage of, e.g., the calcium-bismuth or magnesium-antimony cell is influenced by the activities of the active alkaline earth metal in the electrodes, as expressed by the Nernst equation. The activities may exhibit large nonidealities which may shift the open-circuit voltage of the cell to values greater or less than its expected voltage. As active alkaline earth metal mass moves between electrodes, changes in the respective chemical potentials change the open-circuit cell voltage, so it is not constant over the charge-discharge cycle.

An alternative embodiment of the alkaline earth metal ion energy storage cell 10 or 50 simplifies cell construction. In an alkaline earth metal ion energy storage cell 60, shown in FIG. 5A, the expense and complexity of electrically insulating the interior surface of the container 22 are eliminated. An electronically conductive structure 62, illustratively fixed in position, holds the molten active metal electrode 14. The structure 62 has a contact portion, holding the liquid metal of the negative electrode 14, serving as negative current collector 27 and an exterior portion extending outside the lid 16 and serving as negative terminal 28. An insulating bushing 64, illustratively of boron nitride or alumina, separates the conductive structure 62 from the lid 16.

The structure 62 holds the active electrode 14 away from the container 22, obviating the insulating sheath 24. With reference to FIG. 5B, during discharging, as the volume of the alloy electrode 16 increases, the electrolyte 20 is pushed upward around the active alkaline earth metal electrode 14. The structure 62 is configured so that some of the molten electrode 14 remains between the negative current collector 27 and the electrolyte 20 when the cell is fully discharged.

Surface tension maintains the molten active-metal electrode 14 in place around the contact portion of the structure 62. The contact portion may be, e.g., mesh material folded into stacked layers or coiled into a spiral or tube. The mesh may be composed of strands on the order of 0.1 to 1 mm in diameter, with similar spacing. Alternatively, the permeable contact portion is a sponge. Depending on the composition of the electrode 14, the structure 62 may be made of, e.g., carbon, mild steel, or a steel alloy containing, for example, nickel and/or chromium. Surface-tension approaches to holding liquid metals around a solid conductive structure are known to those skilled in the art.

Figure 6:
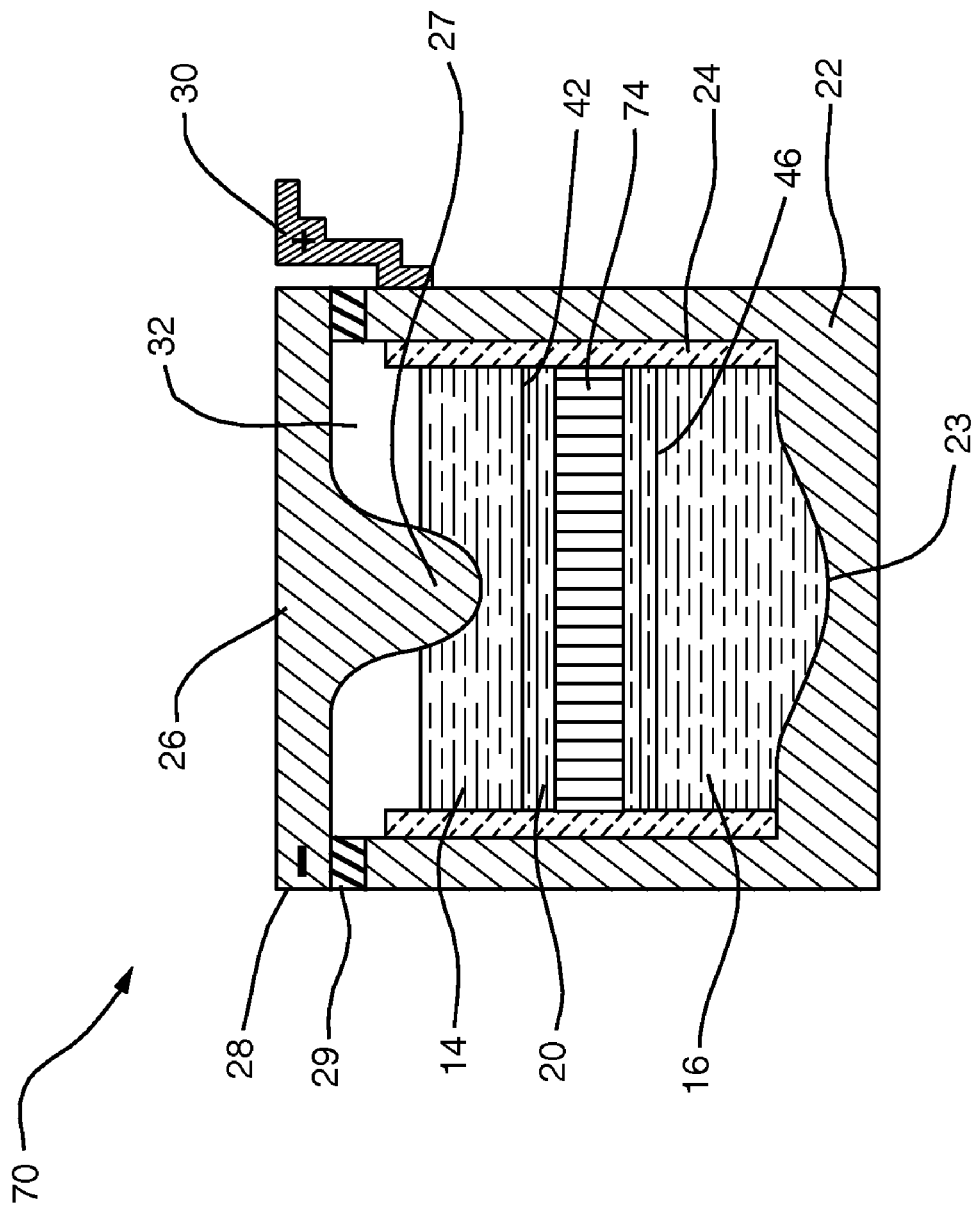
FIG. 6 is a vertical section illustrating an alkaline earth metal-ion energy storage cell constructed in accordance with the invention, having a porous electrode separator held.

In another alternative embodiment, the alkaline earth metal ion energy storage cell is configured for enhanced robustness by impeding mixing of the two electronically conductive liquids during shaking or tipping of the container 22. In a reinforced cell 70, shown in FIG. 6, an electrode separator 74 infiltrated by electrolyte is interposed between the active electrode 14 and the alloy electrode 16 and held by friction to the sheath 24. The electrode separator 74 is illustratively of a material that is stable in contact with the molten electrolyte 20; wet by the molten electrolyte 20; and not wet by either of the electrodes 14 and 16. The separator 74 is permeated with holes or other porosity large enough to allow easy movement of ions between the electrodes 14 and 16, but the surface tension relationships between the separator 74 and the constituents 14, 16 and 20 of the cell 70 hinder contact between the negative 14 and positive 16 electrodes, thereby deterring shorting. The reinforced cell 70 may be constructed with a closer negative-positive electrode spacing, translating to less of the electrolyte 20 and thus greater voltage efficiency, compared to a cell lacking the separator 74.

When the active alkaline earth metal of the cell 70 is calcium, the separator 74 is illustratively of alumina. Other suitable materials for the electrode separator 74 may include ceramics such as magnesia, aluminum nitride, boron nitride, and silica glass. Illustratively, the pores in the separator are on the order of 1 to 5 mm in diameter. Depending on the surface tension values for the electrodes 14 and 16 and the electrolyte 20, the pores may be larger or smaller.

The fixed separator 74 is most appropriate for operating conditions under which the positions of the interfaces 42 and 46 move little, for example a relatively short charge duration or charging at low current density. If the cell charges or discharges at high capacity, however, the interfaces 42 or 46 may move through the fixed separator 74. For operation under these conditions, the cell 70 may be constructed with a floating separator having a thickness less than or equal to the distance between the two interfaces 42 and 46.

The alkaline earth metal ion cell 10, 50, 60 or 70 may be capable of rapidly receiving and dispatching electricity, thereby bridging a supply-demand mismatch. The energy-storage cells may operate at extreme temperatures, such as arctic cold and desert heat, without restriction on geographical location and are realizable in a mobile structure. The power capacity is large, on the order of 10 $m^2$/MW, and scalable for adaptation to a variety of large-scale and commercial power management applications.

Several approaches are possible in expanding the capacity of the alkaline earth metal ion energy storage cell to adapt it to the requirements of large-scale applications, on the order of several MW. In one approach, scalability may be exploited in a single large alkaline earth metal ion energy storage cell by increasing the mass of the electrodes 14 and 16 and thereby increasing the mass of alkaline earth metal available for transfer within the cell. In another approach, a battery including many smaller alkaline earth metal ion cells connected in series may confer a higher battery voltage more practically integrated with the power electronics necessary to serve on large-scale systems. In yet another approach a large array of cells may be interconnected with series and parallel connections for increased robustness with respect to failure due to individual cell malfunction.

Figure 7A:
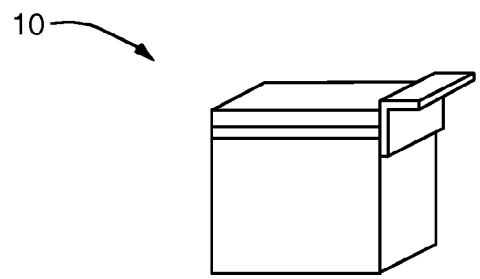
Figure 7B:
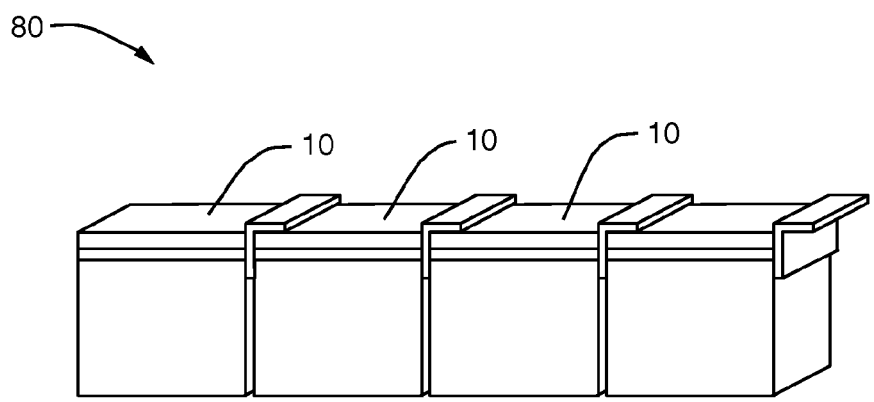
Figure 7C:
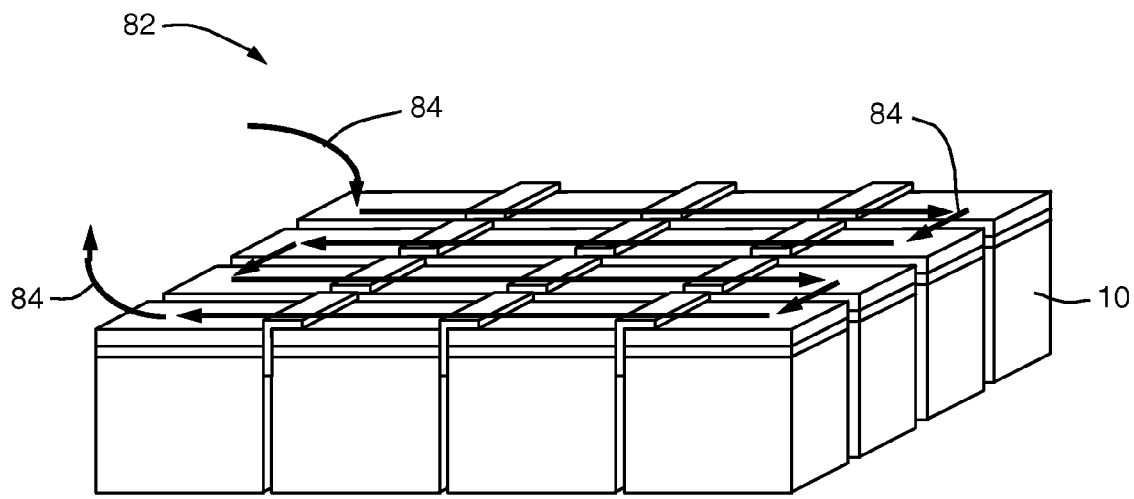

In one embodiment, an alkaline earth metal ion cell 10 of the type shown in FIG. 1 is used to make a battery of more usable voltage in the following way. FIG. 7A shows in perspective view the cell 10 of the configuration type shown in FIG. 1. The cell 10 illustratively is a cube 10 cm long on each side. FIG. 7B shows a linear assembly 80 formed of four such cells 10 connected in series. In FIG. 7C, four linear assemblies 80 are joined to form an array 82 of 16 cells connected in series, in which the direction of electron movement during charging is indicated by arrows 84. Such arrays are stacked and electrically joined six high into modules of 96 cells to create a battery having an open-circuit voltage on the order of 100 V.

One potential use for the alkaline earth metal ion energy storage battery is at a large-scale power generator. The diurnal fluctuation in energy demand reduces plant efficiency, thereby increasing emissions by preventing generator operation at optimum output levels around the clock. A high-capacity electrical energy storage apparatus, with a power capacity greater than 1 MW, could allow load-leveling, which is effected by downloading power from the generator to a storage device during low-demand periods and then uploading power to the grid during times of higher demand, permitting the power plant to operate at a constant level.

A second potential use for the alkaline earth metal ion energy storage battery is at renewable energy source converters. Variability in supply makes management of power generated by renewable sources challenging. Sources such as wind and solar energy generate only intermittently. Without adequate power storage, additional power generators are needed on standby to operate in the event that the wind stops blowing or the sky clouds over. The underutilized capital in the form of excess power generators ultimately may limit the scale of deployment of renewable energy sources. A reliable high-capacity electrical storage device used in conjunction with a renewable energy source could provide dedicated load leveling thereby supporting implementation of renewable energy sources on grid. Such a combination could also support the use of intermittent renewable energy sources as an alternative to generators in remote, off-grid locations to which periodic delivery of fuel would be difficult.

A third potential use for the alkaline earth metal ion energy storage battery is in support of transmission lines. Transmission and distribution systems generally have no storage capacity, so the grid must meet instantaneous demand. As the load on a transmission line approaches its capacity, it incurs heavy ohmic losses which decrease its efficiency. Furthermore, the resulting resistive heating can melt system components and cause transmission line failure. Portable generators of the requisite power capacity (tens of MW) available to boost supply at the load center may be noisy, polluting, and require periodic refueling. Upgrading or replacing transmission lines as they reach capacity limits is very expensive and frequently meets with public opposition. Construction can take as long as five years.

A re-locatable alkaline earth metal ion energy storage unit located near a load center could supply a portion of the energy carried by the transmission line during peak hours of the day, thereby mitigating load demands on the line. Ideally, the storage unit would provide a significant portion, say at least 2% to 20% of the line's capacity, which is typically on the order of 500 MW. Such a unit could defer the need for a transmission line upgrade. Or, a portable alkaline earth metal ion energy storage unit could be deployed to supply emergency power after a system failure or to maintain power delivery during construction of new lines and then be relocated when no longer needed.

Distribution systems from load centers suffer similar problems, albeit at much lower loads, and could be similarly addressed using a portable power storage unit. Commercial consumers requiring a constant supply of electricity are especially vulnerable to blackouts. Auxiliary generators are less than ideal for backup because they require time to reach full output levels. These consumers would benefit from backup power systems, or uninterruptible power systems ("UPS") configured to provide electricity to such a facility in the event of a grid-power failure. A charged alkaline earth metal ion energy storage unit, configured to discharge when the power is interrupted, could function in that role.

Finally, a facility that is sensitive to voltage irregularities can be adversely affected by brownouts or other inconsistencies in delivered power. A UPS in the form of a charged alkaline earth metal ion energy storage unit, configured to discharge to eliminate deviations from the desired power level, could act as a buffer between the grid and the facility to ensure high power quality.

Alkaline earth metal ion energy storage may achieve high current capability using low-cost, abundant materials. Self-segregating configurations enable low-cost manufacturing.

Although specific features of the invention are included in some embodiments and drawings and not in others, it should be noted that each feature may be combined with any or all of the other features in accordance with the invention. It will therefore be seen that the foregoing represents a highly advantageous approach to storage for large-scale and commercial energy management. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A battery configured to exchange energy with an external device, the battery comprising:
    a first positive electrode of an electronically conductive molten alloy, having a first density, comprising an alkaline earth metal and at least one miscible element;
    a first negative electrode of an electronically conductive liquid, having a second density, comprising the alkaline earth metal;
    a first liquid electrolyte, having a third density, comprising cations of the alkaline earth metal, in contact with the first negative and positive electrodes;
    a first positive current collector, in electrical contact with the first positive electrode, configured to connect to the external device; and
    a first negative current collector, in electrical contact with the first negative electrode, configured to connect to the external device,
wherein the alkaline earth metal is present at respective disparate chemical potentials in the first positive and negative electrodes, originating a voltage between the first positive and negative electrodes.

2. The battery of claim 1 further comprising:
    a second positive electrode of an electronically conductive molten alloy comprising an alkaline earth metal and at least one miscible element;
    a second negative electrode of an electronically conductive liquid, comprising the alkaline earth metal;
    a second liquid electrolyte comprising cations of the alkaline earth metal, in contact with the second negative and positive electrodes;
    a second positive current collector in electrical contact with the second positive electrode; and
    a second negative current collector in electrical contact with the second negative electrode,
wherein the alkaline earth metal is present in respective disparate chemical potentials in the second positive and negative electrodes, originating a voltage between the second positive and negative electrodes, and the second negative and positive current collectors are connected in series or parallel with the first negative and positive current collectors.

3. The battery of claim 1 further comprising a plurality of electrically connected cells, each having
    a negative electrode of an electronically conductive liquid comprising an alkaline earth metal;
    a positive electrode of an electronically conductive molten alloy comprising the alkaline earth metal and at least one miscible element;
    a liquid electrolyte comprising cations of the alkaline earth metal, in contact with the negative and positive electrodes;
    a negative current collector in electrical contact with the negative electrode; and
    a positive current collector, in electrical contact with the positive electrode,
wherein the respective negative and positive current collectors of the plurality of electrically connected cells are electrically connected with the first negative and positive current collectors.

4. The battery of claim 1 wherein the alkaline earth metal is magnesium.

5. The battery of claim 1 wherein the alkaline earth metal is calcium.

6. The battery of claim 1 wherein the first negative electrode further comprises an additional metal.

7. The battery of claim 1 wherein the additional metal is an alkaline earth metal.

8. The battery of claim 1 wherein the at least one miscible element comprises at least one of tin, lead, bismuth, antimony, tellurium and selenium.

9. The battery of claim 1 wherein the first liquid electrolyte comprises a chloride of the alkaline earth metal.

10. The battery of claim 1 wherein the first negative electrode, first electrolyte and first positive electrode are at an operating temperature less than 750° C.

11. The battery of claim 1 wherein the first density is greater than the third density and the second density is less than the third density.

12. The battery of claim 11 further comprising a separator, of a material wettable by the first liquid electrolyte but not wettable by the first negative electrode or the first positive electrode, disposed between the first positive and negative electrodes.

13. The battery of claim 1 wherein the first negative current collector comprises a portion containing the first negative electrode by surface tension.

14. A battery configured to exchange energy with an external device, the battery comprising:
    a positive electrode of an electronically conductive molten alloy, having a first density, comprising calcium at a first chemical potential and a miscible element;
    a negative electrode of an electronically conductive liquid mixture, having a second density, comprising calcium at a second chemical potential and an additional metal, the second chemical potential differing from the first chemical potential, generating a voltage between the positive and negative electrodes;
    a liquid electrolyte, having a third density, comprising calcium cations, in contact with the negative and positive electrodes,;
    a negative current collector, in electrical contact with the negative electrode, configured to connect to the external device; and
    a positive current collector, in electrical contact with the positive electrode, configured to connect the external device,
wherein the electrolyte and negative and positive electrodes are at an operating temperature less than 750° C., the first density is greater than the third density and the second density is less than the third density.

15. The battery of claim 14 wherein the voltage is at least 0.5 V.

16. The battery of claim 14 wherein the additional metal is magnesium.

17. The battery of 14 wherein the negative electrode is less than 40 mole percent calcium.

18. The battery of claim 14 wherein the miscible element is bismuth.

19. The battery of claim 14 wherein the electrolyte comprises calcium chloride.

20. The battery of claim 19 wherein the electrolyte further comprises at least one potassium halide.

21. The battery of claim 14 further comprising a separator, of a material wettable by the electrolyte but not wettable by the negative or positive electrode, disposed between the negative and positive electrodes.

22. The battery of claim 14 wherein the negative current collector comprises a portion containing the negative electrode by surface tension.

23. A method of storing electrical energy from an external circuit, the method comprising:
   providing an electrochemical cell comprising
      a positive electrode of an electronically conductive liquid alloy comprising an alkaline earth metal and a miscible element,
      a negative electrode of an electronically conductive liquid comprising the alkaline earth metal,
      a liquid electrolyte comprising cations of the alkaline earth metal, in contact with the negative and positive electrodes, configured to connect with the external circuit;
      a positive current collector, in contact with the positive electrode, configured to connect to the external circuit, and
      a negative current collector, in contact with the negative electrode, configured to connect to the external circuit;
   electrically connecting the external circuit to the negative and positive current collectors; and
operating the external circuit so as to drive transfer of alkaline earth metal from the positive electrode, through the electrolyte as cations, and to the negative electrode, thereby delivering energy from the external circuit to the electrochemical cell.

24. The method of claim 23 further comprising electrically connecting an external load to the negative and positive current collectors, thereby enabling simultaneous transfer of alkaline earth metal from the negative electrode, through the electrolyte ionically, and to the positive electrode, thereby delivering energy from the electrochemical cell to the external load.

25. The method of claim 23 wherein the external circuit is an electric power plant.

26. The method of claim 24 wherein at least one of the external circuit and the external load is a power transmission line.

27. The method of claim 23 wherein the external circuit delivers energy converted from a renewable energy source.

28. The method of claim 23 wherein the cell is part of an uninterruptible power supply.

29. The method of claim 23 wherein the electrolyte and the positive and negative electrodes are at an operating temperature less than 750° C.

30. The method of claim 23 wherein the liquid electrolyte is configured to contact the positive electrode over a surface and transferring alkaline earth metal from the positive electrode constitutes an electrical current greater than 1 A/cm$^2$ across the surface.

31. The method of claim 14 wherein the negative electrode is greater than 60 mole percent calcium.

32. The battery of claim 14 wherein the miscible element is aluminum.

33. An energy storage cell comprising:
   an electronically conductive, molten positive electrode comprising an alkaline earth metal and at least one element in addition to the alkaline earth metal;
   a electronically conductive, liquid negative electrode comprising the alkaline earth metal;
   a liquid electrolyte, comprising cations of the alkaline earth metal, in contact with the negative and positive electrodes;
wherein the alkaline earth metal is present at respective disparate chemical potentials in the positive and negative electrodes, originating a voltage between the positive and negative electrodes.

34. A cell configured to exchange energy with an external device, the cell comprising:
   an electronically conductive, molten positive electrode comprising an alkaline earth metal and at least one element in addition to the alkaline earth metal;
   an electronically conductive, liquid negative electrode comprising the alkaline earth metal;
   a liquid electrolyte, comprising cations of the alkaline earth metal, in contact with the negative and electrodes;
   a positive current collector, in electrical contact with the positive electrode, configured to connect to the external device; and
   a negative current collector, in electrical contact with the negative electrode, configured to connect to the external device,
wherein the alkaline earth metal is present in respective disparate thermodynamic activities in the positive and electrodes, originating a voltage between the positive and electrodes.

* * * * *